United States Patent [19]

Welch, Sr.

[11] Patent Number: 4,681,504
[45] Date of Patent: Jul. 21, 1987

[54] STORAGE AND INVENTORY CONTROL SYSTEM FOR KEYS

[76] Inventor: James A. Welch, Sr., 2132 Danshire Dr., Tallahassee, Fla. 32308

[21] Appl. No.: 753,967

[22] Filed: Jul. 11, 1985

[51] Int. Cl.$^4$ .............................................. B65G 1/06
[52] U.S. Cl. .................................... 414/268; 221/90; 232/43.1; 414/273; 414/276; 414/281; 414/786
[58] Field of Search ............... 414/134, 136, 274, 276, 414/281, 744 C, 267–270, 273, 786; 221/90; 232/43.1, 43.3, 47; 340/525

[56] References Cited

U.S. PATENT DOCUMENTS

| | | | |
|---|---|---|---|
| 3,076,566 | 2/1963 | Dennis | 414/276 X |
| 3,157,296 | 11/1964 | Oldham | 414/273 |
| 3,247,929 | 4/1966 | Langley | 414/276 X |
| 3,297,379 | 1/1967 | Artaud et al. | 312/223 |
| 3,473,675 | 10/1969 | Goldammer et al. | 414/273 |
| 3,478,254 | 11/1969 | Lafrisco et al. | 414/274 X |
| 3,520,424 | 7/1970 | Lemelson | 414/273 |
| 3,536,194 | 10/1970 | Novak | 209/80.5 |
| 3,610,445 | 10/1971 | Kitchen et al. | 414/276 |
| 3,750,804 | 8/1973 | Lemelson | 414/276 |
| 3,782,565 | 1/1974 | Doran et al. | 414/274 |
| 3,822,025 | 7/1974 | Loos | 414/281 X |
| 3,920,195 | 11/1975 | Sills et al. | 242/180 |
| 3,964,577 | 6/1976 | Bengtsson | 186/1 R |
| 3,968,888 | 7/1976 | Van Vliet | 414/273 |
| 4,225,278 | 9/1980 | Weiner | 414/273 |
| 4,236,649 | 12/1980 | Fellner et al. | 221/90 |
| 4,239,436 | 12/1980 | Wildenaur | 414/276 |
| 4,251,177 | 2/1981 | Neuhaeusser et al. | 414/276 |
| 4,549,170 | 10/1985 | Serres et al. | 340/525 X |

Primary Examiner—Frank E. Werner
Assistant Examiner—David A. Bucci
Attorney, Agent, or Firm—Eric P. Schellin

[57] ABSTRACT

The invention is directed to a storage and inventory control system for keys wherein a microprocessor controlled positioning assembly directs a key to an inclined storage receptacle, and a withdrawal assembly releases the key from the storage receptacle. The positioning assembly is provided with an inclined receiving receptacle that is selectively positioned to release the key into an appropriate storage receptacle. The withdrawal assembly is provided with an opening element for releasing the key from the storage receptacle so that it can be picked up by a user. The microprocesor records usage data such as use of the key, user of the key, and the time of key usage.

3 Claims, 6 Drawing Figures

STORAGE AND INVENTORY CONTROL SYSTEM FOR KEYS

BACKGROUND OF THE INVENTION

1. Field of the Invention

The invention is directed to a storage and inventory control system for keys, wherein each key is provided with an inclined receptacle in which the key is stored for future use. A microprocessor controls the release of keys and records who used the key, for what purpose, and for how long.

2. Description of the Prior Art

In car dealerships and automobile leasing agencies it is necessary to keep track of a large number of car keys. The keys are used by salespersons demonstrating the cars, potential buyers test driving the cars, and maintenance personnel maintaining and moving the cars. Typically car dealerships and leasing agencies employ a hook board on which individual keys are mounted for all of the cars on the lot. Each set of car keys is alloted an individual hook. A person needing a key merely takes the key off the board.

As will be appreciated, such a system sometimes results in unauthorized use of vehicles. In addition it becomes difficult to determine if a car is in the shop for routine maintenance or is currently in use by a salesperson or potential buyer.

Automated warehousing systems for storing and handling individual articles are well known in the art, see U.S. Pat. Nos. 3,157,296; 3,297,379; 3,920,195; 3,968,888 and 4,239,436. Such systems maybe provided with computer control means for recording article inventories.

Automated storage and article handling systems have been proposed that are provided with inclined racks on which a plurality of similar articles are stored, see U.S. Pat. No. 3,520,424. In a similar system individual tape cassettes are stored in individual inclined compartments wherein the cassettes are held in place by a stop means. Such a cassette storage and handling system is disclosed in U.S. Pat. No. 4,251,177.

Automated package handling systems have also been proposed for security applications, see U.S. Pat. Nos. 3,964,577 and 4,225,278. Generally a user is supplied with a container in which he places articles to be stored. The container would then be automatically returned to a secure area and indexed accordingly.

Cards encoded with data maybe stored in a rectangular matrix of addressable storage compartments, as proposed in U.S. Pat. Nos. 3,473,675 and 3,536,194. An electronic key board maybe used to address individual compartments and select data cards for a data processing machine.

SUMMARY

It is the object of the present invention to provide an automated storage and inventory control system for keys, and especially car keys. The disclosed system employs a microprocessor to record the use of each key, who used the key, and for what purpose. As such a manager can monitor the use of keys and the activities of his personnel.

It is another object of the present invention, to provide a secure unit for storing keys wherein access can be only be gained by inputting the proper employee code. The keys are stored in a secure enclosure having a plurality of individual receptacles in which an individual key is stored. By inputting the proper code, the key is released and deposited on a receiving tray where it maybe picked up by a user.

It is another object of the present invention to provide a key handling system that is completely automated. A key is deposited into the machine, a key number encoded, and the key thereafter automatically directed to a specific receptacle by means of an automated handling assembly.

The present invention comprises a rectangular matrix of inclined storage receptacles in which individual keys are stored. Each storage receptacle is provided with an opening gate that is held normally closed by a latching means comprising permanent magnets.

A positioning means positions a key deposited into the machine into the proper storage receptacle. The positioning means comprises two orthogonal threaded shafts joined together by a first cross-shaped nut assemby on which is mounted an inclined receiving receptacle having a gate. By rotating the shafts, the receiving receptacle is positioned to the correct vertical column and horizontal row. When the receiving receptacle is positioned adjacent to the correct storage receptacle, the gate of the receiving receptacle is opened allowing the key to slide into the correct storage receptacle. By arranging the receptacles in an inclined fashion the keys are allowed to cascade from the receiving receptacle to the storage receptacle.

The machine is also provided with a withdrawal means for removing a key from a storage receptacle. The withdrawal means comprises two orthogonal threaded shafts that are joined together at a second cross-shaped nut assembly. An opening element comprising an electromagnet is mounted on the nut assembly and is used to magnetically open the selected receptacle. The threaded shafts are each coupled to an electric motor and are used to position the cross-shaped nut assembly and opening element adjacent the correct storage receptacle. When the storage receptacle is opened, a key slides out and is deposited on a receiving tray where it may be picked up by the user.

The operation of the positioning means and the withdrawal means is controlled by a microprocessor. The microprocessor is provided with operating instructions and subroutines for controlling the movement of the electric motors rotating the threaded shafts so that the associated elements are correctly positioned. In addition the microprocessor collects usage data for monitoring the use and users of the keys.

DETAILED DESCRIPTION

Figure 1:
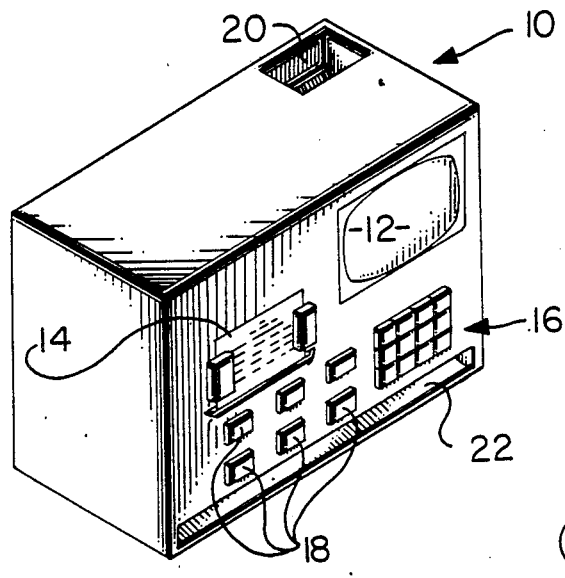
FIG. 1 is a perspective view of the machine.

FIG. 1 is a perspective view of the present invention, which comprises enclosure 10 having cathode ray display tube 12 and printer 14. The front of the enclosure is also provided with key pad 16 and a plurality of switches 18. The top of the enclosure is provided with opening 20 into which a key being returned is deposited. At the base of the enclosure is receiving tray 22 into which a key is released from storage to be picked up by the user.

Figure 2:
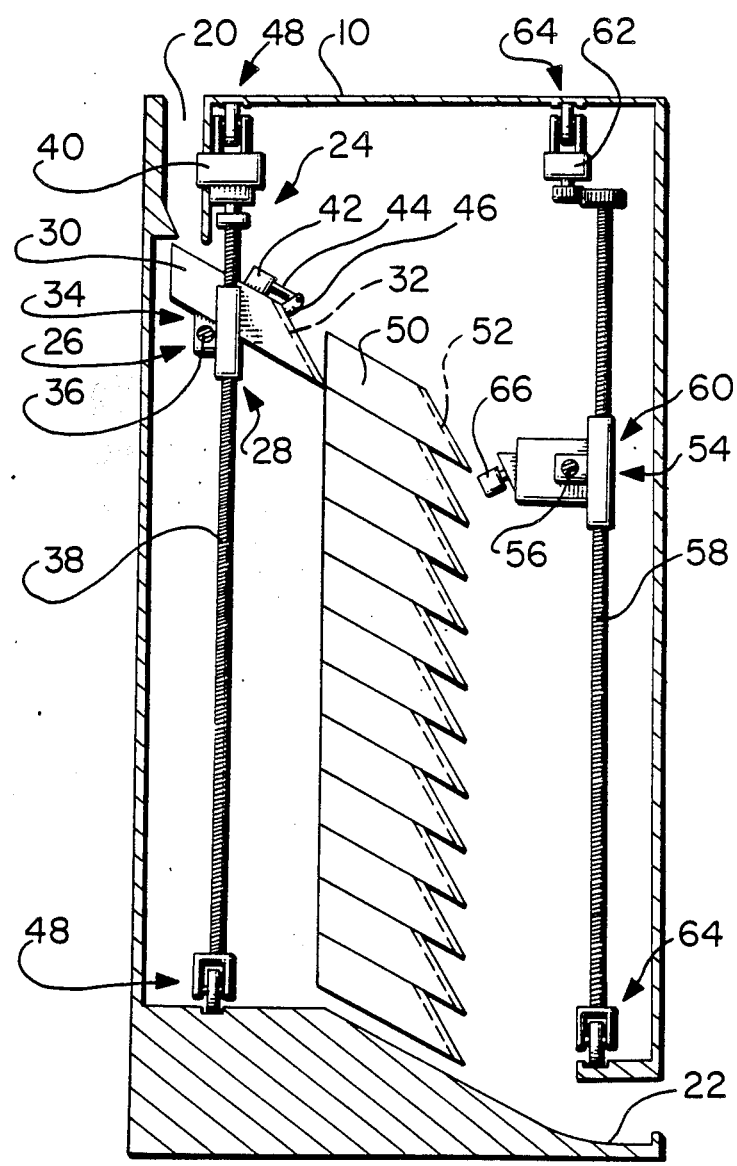
FIG. 2 is a side view of the internal workings of the machine.
Figure 3:
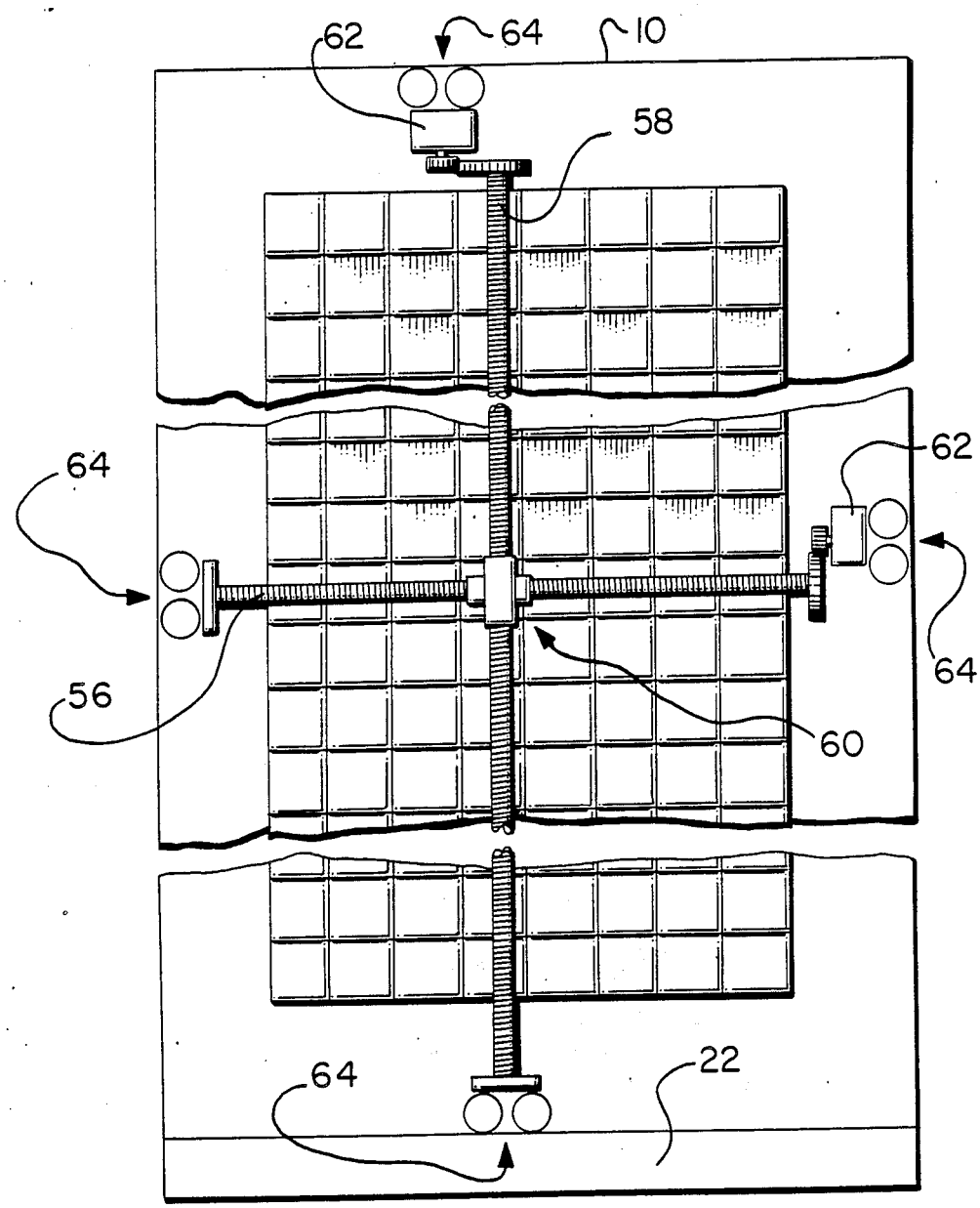
FIG. 3 is a front view of the internal workings of the machine.
Figure 4:
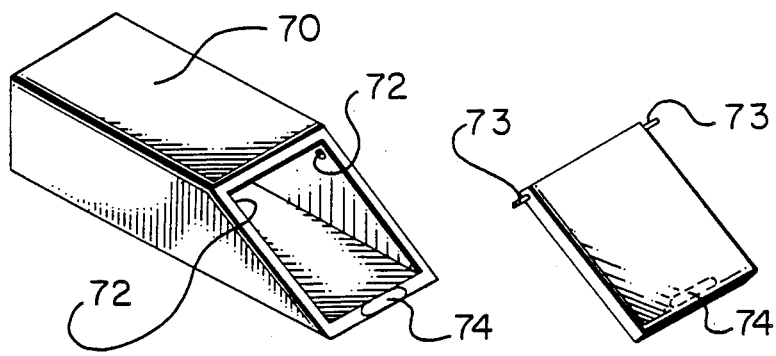
FIG. 4 is a perspective exploded view of one of the receptacles and associated opening gate.
Figure 5:
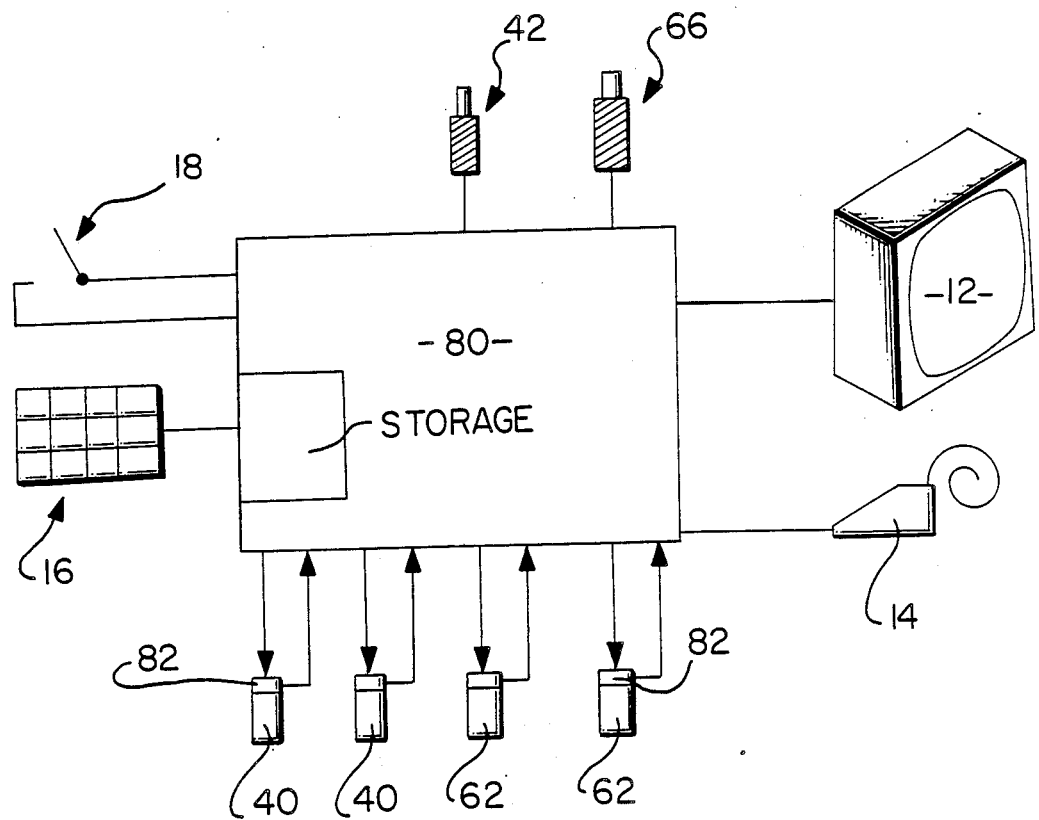
FIG. 5 is a schematic of the operation of the machine.
Figure 6:
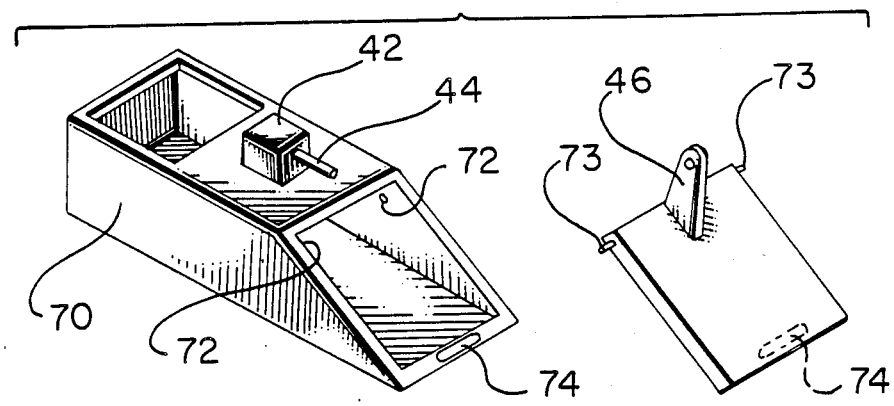
FIG. 6 is a perspective exploded view of the receiving receptacle and opening gate.

The interior of the enclosure is provided with positioning means 24 comprising vertical column selection unit 26 and horizontal row selection unit 28. As illustrated in FIG. 2, a key being dropped into opening 20 is deposited in inclined receiving receptacle 30 having opening gate 32. The receiving receptacle is mounted on first cross-shaped nut assembly 34 which is operationally mounted on horizontal threaded shaft 36 and vertical threaded shaft 38. Both shafts extend across the enclosure and are selectively rotated by electric motors. Electric motor 40 is used to rotate vertical threaded shaft 38. Both ends of each threaded shaft is mounted on a slide assembly 48 to permit free movement of the shafts. Therefore column selection unit 26 is formed by motor driven threaded shaft 36, and row selection unit 28 is formed by motor driven threaded shaft 38.

Only one inclined receiving receptacle is mounted on first cross-shaped nut assembly 34. In this way the receiving receptacle may traverse the entire width and height of the interior of the enclosure. Upon reaching the correct vertical column and horizontal row, gate 32 is opened by solenoid 42 having slender rod 44 that is coupled to upstanding portion 46 of gate 32. Opening of gate 32 allows the key held within the receiving receptacle to slide out of the receptacle into storage receptacle 50. It should be noted that receiving receptacle 30 has an open top adjacent to opening 20 so that a key is free to drop in the receiving receptacle. Solenoid 42 is mounted to a cross bar over the top of the receptacle that is isolated from opening 20.

A plurality of inclined storage receptacles 50 are arranged in a rectangular matrix in the interior of the enclosure and are used for storing individual keys in individual receptacles. As with the receiving receptacles each storage receptacle is provided with opening gate 52.

To remove a key from a storage receptacle withdrawal means 54 must be activated. Withdrawal means 54 is very similar to the positioning means and comprises horizontal threaded shaft 56, vertical threaded shaft 58, and cross-shaped nut assembly 60. Each threaded shaft is provided with electric motor 62 that can selectively rotate each shaft. The ends of each shaft are mounted on slide assemblies 64 so that the shafts are free to move in response to the movement of the other threaded shaft. The slide assemblies may comprise ball bearings or rollers on a rail assembly. Opening element 66 comprising an electromagnet is secured to the cross-shaped nut assembly and is used to open the opening gate of the storage receptacle. When the electromagnet is energized the opening gate is pivotally drawn upwardly, thereby releasing the key from the inclined storage receptacle.

The general structural configuration of both the receiving receptacle and the storage receptacles are identical and comprise rectangular box 70 having an opening at each end. The lowermost end of the inclined receptacle is provided with opening gate 71 having axles 73 that are pivotally coupled to the box at 72. The opening gate and the box are both provided with permanent magnets 74 that act as latching means to hold the gate closed during normal operating conditions.

As noted previously the receiving recptacle is provided with an open top to permit a key to fall into the receptacle from opening 20. In addition the opening gate of the receiving receptacle is provided with an upstanding portion that acts as a moment arm for opening the gate. The solenoid used in opening the gate is stronger than the permanent magnet latching means.

The positioning means and the withdrawal means are controlled by a control means comprising microprocessor 80. The microprocessor is electrically coupled to electric motors 40 and 62, which rotate the threaded shafts and selectively position the nut assemblies and thereby the receiving receptacle of the positioning means and the opening element of the withdrawal means. Each motor is provided with an encoder 82 which is coupled to the microprocessor for detecting the rotational position of the motor.

The microprocessor has stored operating instructions and subroutines which control the operation of the positioning means and withdrawal means. These operating instructions and subroutines essentially identify every key location with a key number and a storage receptacle location number. Therefore when a key is deposited into the machine, the user through the keypad encodes the key number into the microprocessor. The microprocessor sends directions to the electric motors of the positioning means to move the key through the receiving receptacles until it is positioned within the correct storage receptacle. If a key is desired from storage the user encodes the appropriate key number into the microprocessor through the keypad and the microprocessor sends directions to the withdrawal means so that it opens the correct storage receptacle.

In addition to the operating instructions and subroutines the microprocessor also stores usage data concerning each key, user and use. More specifically, when a key is to be removed or returned the user in addition to encoding the key number, must also encode, through the keypad, a user code identifying the user. In this way the machine can prevent unauthorized use of the keys by an improper employee code number and also monitor user use of the keys.

The microprocessor is provided with an external or internal clock which is used to calculate time usage data of the keys. Principally the elapsed time the key is used, is recorded along with the actual hours in use. Therefore a record of key use would include an employee identifier number, a key number, elapsed time used and actual hours used. The actual hours used is important because it can be used to determine if employees have been using vehicles during non-business hours.

A use code would also be included by depressing an appropriate switch 18 on the front of the enclosure. For instance one switch may indicate demonstration and another with maintenance. This may act as an additional control whereby a specific user may designate only one use, for example a salesman may only designate the use as demonstration, or maintenance personnel may only designate maintenance.

In returning keys the user encodes in the key number and the user number. The microprocessor then compares its data to determine if the identified key was checked out to the identified employee. If the key and employee match, the microprocessor returns the key to storage. If the key and user do not match, an instruction appears on the cathode ray display tube 12 asking the user to reencode the key number and employee number.

To facilitate the machine's use as a management tool the machine is provided with a cathode ray display tube and a printer. By depressing an appropriate switch 18 a subroutine in the microprocessor is called into action that requests the status of all keys and displays the results on the display tube. If a permanent record needs to be made, another key switch 18 maybe depressed actuating the printer.

The above described invention has been described with regards to a particular embodiment primarily adapted to a car dealership or car leasing agency, however the invention should not be so limited, but should be limited solely by the claims that follow:

I claim:

1. A storage and inventory control assembly for a plurality of individual keys, wherein each individual key has a distinct purpose, said assembly comprising:

a plurality of inclined storage receptacles, each receptacle adapted and constructed to hold at least one individual key, each receptacle is provided with an openable gate which holds a key in the receptacle when the gate is closed and release a key from the receptacle when the gate is opened;

a positioning means for receiving individual keys and placing a key in a selected storage receptacle;

a withdrawal means for withdrawing an individual key from one of the storage receptacles, the withdrawal means having an opening element for opening the opening gate and releasing the key from the selected storage receptacle;

whereby a control means controls the operation of the positioning means and the withdrawal means, the control means directs the positioning means to deposit a key in a selected storage receptacle and also directs the withdrawal means to withdraw a key from a selected storage receptacle, the control means comprises a microprocessor that is electrically coupled to the positioning means and the withdrawal means, the microprocessor is provided with a storage means for storing operational instructions and subroutines, and usage data about the use of individual keys, an input means is used for inputting into the microprocessor a user identification code, identifying the user, a use code identifying how an individual key is used, and a display means is provided displaying key usage data stored in the microprocessor including how an individual key is used, who used an individual key, and an individual key's current location.

2. A method of controlling access to and monitoring the usage of keys, comprising the following steps;

storing a plurality of keys in a plurality of inclined storage receptacles, the plurality of storage receptacles are housed in a security enclosure, each storage receptacle is adapted and constructed to hold at least one individual key and each receptacle is provided with an openable gate which when opened releases a key stored in the receptacle;

withdrawing a selected key from a storage receptacle by operating a withdrawal means to open the openable gate releasing a key stored in a receptacle;

positioning an individual key into a storage receptacle by placing an individual key into a positioning means which directs the individual key to the correct storage receptacle; and controlling the operation of the withdrawal means and the positioning means by a control means which directs the positioning means to deposit a key in a selected storage receptacle upon receipt of a key and a key code from an input means; and directs the withdrawal means to release a key from a storage receptacle in response to a user identification code from an input means; the control means is also provided with a storage means for storing key usage information by inputting a use code into the input means which is directed to the storage means, the key usage information includes how an individual key is used, who used an individual key, and an individual key's current location, the key usage information can be displayed on a display means in response to a command from the control means.

3. A method of controlling access to and monitoring the usage of keys as defined by claim 2, comprising the additional step of moving an opening element so that it is aligned with a selected openable gate before opening the openable gate.

* * * * *